United States Patent [19]

Ault et al.

[11] 4,063,191

[45] Dec. 13, 1977

[54] XENON FLUORIDE LASER UTILIZING NITROGEN TRIFLUORIDE AS A FLUORINE DONOR

[75] Inventors: Earl Rema Ault, Rolling Hills Estates; Robert Spencer Bradford, Jr., Los Angeles; Mani Lal Bhaumik, Malibu; Danny Doyce Floyd, Carson, all of Calif.

[73] Assignee: Northrop Corporation, Los Angeles, Calif.

[21] Appl. No.: 693,710

[22] Filed: June 7, 1976

[51] Int. Cl.$^2$ .............................................. H01S 3/00
[52] U.S. Cl. ............................................. 331/94.5 G
[58] Field of Search .................................. 331/94.5 G

[56] References Cited

PUBLICATIONS

Ault et al., *Appl. Phys. Lettr.*, vol. 27, No. 7, Oct. 1, 1975, pp. 413–415.

Primary Examiner—Martin H. Edlow
Attorney, Agent, or Firm—Edward A. Sokolski

[57] ABSTRACT

A laser using an electron beam pump mixture of argon, xenon and nitrogen trifluoride. High power xenon fluoride laser emission is efficiently generated by employing nitrogen trifluoride as a fluorine donor.

5 Claims, 1 Drawing Figure

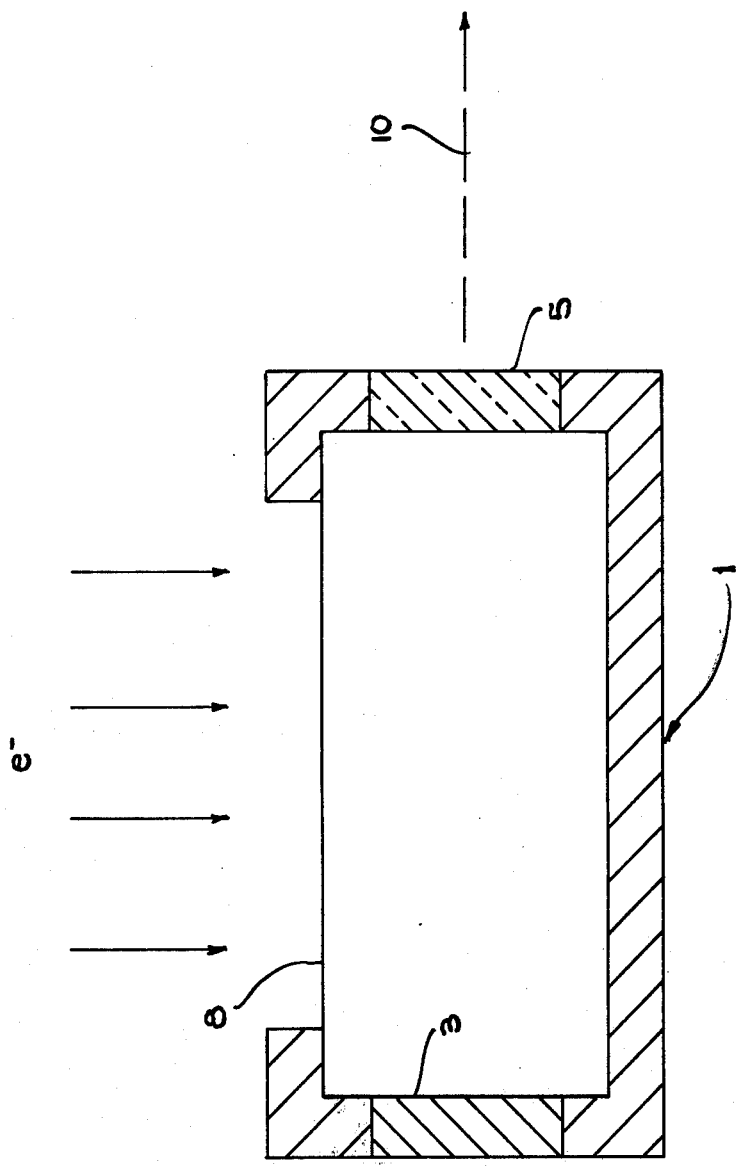

XENON FLUORIDE LASER UTILIZING NITROGEN TRIFLUORIDE AS A FLUORINE DONOR

This invention relates to gas lasers, and more particularly to such a laser employing xenon fluoride as the active laser molecule with nitrogen trifluoride being employed as a flourine donor.

Lasers having xenon flouride emission using a mixture of Ar, Xe, and $F_2$ have been described in a paper presented by J. J. Ewing and C. A. Brau on May 29, 1975 at the Conference on Laser Engineering and Applications, Washington, D.C. It has been found that the use of $F_2$ as a donor has several shortcomings. First, $F_2$ is highly corrosive and tends to attack the walls of the gas chamber causing rapid fluorine degradation. Further, $F_2$ tends to absorb at the laser emission wavelength, thus cutting down the output of the laser. The present invention overcomes the aforementioned shortcomings by utilizing $NF_3$ as a flourine donor in a XeF laser, rather than $F_2$. $NF_3$ is substantially less corrosive than $F_2$ and does not absorb at the laser emission wavelength. Further, it has been found that the laser mixture containing $NF_3$ is reusable for a substantially greater number of shots than the mixture containing $F_2$ (30 shots as compared with 5).

The sole FIGURE of the drawings schematically illustrates the device of the invention.

Briefly described, our invention is as follows: A mixture of Ar, Xe and $NF_3$ is fed to a laser gas chamber and pumped with an electron beam. A laser oscillator cavity, whose optical axis passes through the chamber, is formed by means of oppositely positioned reflectors, xenon flouride laser emission being generated with this cavity.

Referring now to the sole FIGURE, a laser gas chamber 1 has internal reflecting mirrors 3 and 5 at the opposite ends thereof and a thin metal foil 8 forming one of the side walls thereof. Foil 8 may be of titanium of the order of 3 mils in thickness. Mirror 5 is partially reflective and with total reflector 3 forms a laser oscillator cavity. Chamber 1 contains a gas mixture of Ar, Xe and $NF_3$. A suitable electron gun ($e-$) is used to pump the gas mixture in chamber 1. A laser output beam 10 is generated by virtue of the population inversion stimulated in the gas by the pumping action and the oscillation of the beam in the oscillator cavity. This gun may be a commercially available Physics International Model Pulserad No. 110A, having a 1MeV, 20kA, 20nsec pulse output. Using this $e$ beam pumping, optimum high power XeF laser emission has been obtained at 351.1 and 353.3nm from an Ar, Xe and $NF_3$ mixture in the ratio of 250:25:1 at a total pressure of 1.7 atmospheres. Using the above described $e$ beam pumping with this mixture, a peak laser power of 0.5 MW was obtained.

The laser mixture was found to be reusable for as many as 30 shots.

Acceptable results can be achieved (using the above indicated $e$ beam pumping) with the laser mixture within the following ranges of proportions: Ar, 250: Xe, 12–50: and $NF_3$, 0.5–2 parts by volume (at a total pressure of 1.7–3.2 atmospheres).

While the invention has been described and illustrated in detail, it is to be clearly understood that this is intended by way of illustration and example only and is not to be taken by way of limitation, the spirit and scope of this invention being limited only by the terms of the following claims.

We claim:

1. An XeF gas laser comprising:
   a gas chamber,
   a pair of reflectors, one of which is only partially reflective, positioned opposite each other to define a laser oscillator cavity which passes through the chamber,
   a gas mixture comprising Ar, Xe, and $NF_3$ being fed to said chamber, and
   laser pump means for exciting said gas mixture, said $NF_3$ operating as a flourine donor to the Xe to form XeF, the pump means effecting a population inversion in the XeF whereby XeF laser emission passes through said partial reflector.

2. The laser of claim 1 wherein said gas mixture comprises Ar, 250: Xe, 12–50: $NF_3$, 0.5–2 parts by volume.

3. The laser of claim 1 wherein said gas mixture comprises Ar, 250: Xe, 25: $NF_3$, 1 parts by volume at a total pressure of 1.7 atmospheres.

4. The laser of claim 1 wherein said pump means comprises an electron gun having a pulsed $e$ beam output.

5. The laser of claim 3 wherein said pump means comprises an electron gun having a pulsed $e$ beam output.

* * * * *